(12) United States Patent
Takiwaki

(10) Patent No.: US 6,725,531 B2  
(45) Date of Patent: Apr. 27, 2004

(54) NEEDLE BEARING ASSEMBLING APPARATUS

(75) Inventor: Yuji Takiwaki, Toyama (JP)

(73) Assignee: Tanaka Seimitsu Kogyo Co., Ltd., Toyamo (JP)

(*) Notice: Subject to any disclaimer, the term of this patent is extended or adjusted under 35 U.S.C. 154(b) by 243 days.

(21) Appl. No.: 09/995,684

(22) Filed: Nov. 29, 2001

(65) Prior Publication Data

US 2002/0066178 A1 Jun. 6, 2002

(30) Foreign Application Priority Data

Dec. 1, 2000 (JP) ................................. 2000/366731

(51) Int. Cl.⁷ ............................................. B21D 53/10
(52) U.S. Cl. ................ 29/724; 29/898.06; 29/898.062; 29/809
(58) Field of Search ................ 29/724, 898.06, 29/898.062, 898.07, 809, 810; 53/147, 541, 543

(56) References Cited

U.S. PATENT DOCUMENTS 2,172,145 A * 9/1939 Rehnberg  
2,334,227 A * 11/1943 Stallman  
3,014,267 A * 12/1961 Horvath  
3,789,478 A * 2/1974 Stenger  
4,175,319 A * 11/1979 Frauenhoffer et al.  
4,357,749 A * 11/1982 Lira  
4,425,703 A * 1/1984 Rise  
4,837,910 A * 6/1989 Nantel  
6,089,000 A * 7/2000 Carlberg et al.

FOREIGN PATENT DOCUMENTS

JP 60-076924 5/1985  
JP 05-050341 3/1993  
JP 08-323557 12/1996

* cited by examiner

Primary Examiner—David P. Bryant  
Assistant Examiner—Eric Compton  
(74) Attorney, Agent, or Firm—Wenderoth, Lind & Ponack, L.L.P.

(57) ABSTRACT

The present invention provides an apparatus capable of assembling a needle bearing. This needle bearing assembling apparatus is provided with a thrust unit adapted to sequentially feed rows of needles, an arrangement unit adapted to arrange the needles into a configuration corresponding to a hollow formed on an inner side of a roller outer race, and a device for firmly fitting the needles, while in the configuration, into the hollow on the inner side of the roller outer race.

21 Claims, 5 Drawing Sheets

NEEDLE BEARING ASSEMBLING APPARATUS

BACKGROUND OF THE INVENTION

1. Field of the Invention

This invention relates to a needle bearing assembling apparatus.

2. Description of the Related Art

A hitherto known needle bearing assembling apparatus is formed so that, when a needle bearing is assembled, needles are fed one by one to a rotating index shaft so as to annularly arrange a predetermined number of needles and thereby insert the needles into a hollow on an inner side of a roller outer race. Such a needle bearing assembling apparatus has already been known from Japanese Patent Laid-Open No. 50341/1993.

In the above-described known needle bearing assembling apparatus, needles are fed one by one onto an inner side of a roller outer race, so that it takes much time to insert a predetermined number of needles thereinto in an annular configuration. Therefore, it is difficult to say that this needle bearing assembling apparatus has a high operation efficiency. Moreover, feeding a predetermined number of needles one by one makes it difficult to ascertain a number thereof fed in practice, and causes an incidence of shortage of a number of the needles to increase and a yield of a needle bearing to lower.

SUMMARY OF THE INVENTION

The present invention has been made in view of the above-described circumstances, and provides a needle bearing assembling apparatus capable of solving problems encountered in the known needle bearing assembling apparatus, and having a high operation efficiency and a high yield.

The inventors of the present invention earnestly studied attainment of such a needle bearing assembling apparatus to discover that a needle bearing assembling apparatus provided with a thrust unit adapted to feed needles sequentially in a row, an arrangement unit adapted to properly arrange needles fittable within a hollow formed on an inner side of a roller outer race, and a mechanism having a device for fitting the arranged needles firmly into the hollow on the inner side of the roller outer race, caused an operation efficiency of the above-mentioned known needle bearing assembling apparatus to be improved. The inventors have also discovered that feeding the needles collectively facilitates ascertaining of a number of passing needles, and that providing a needle regulating unit adapted to arrange needles annularly so that the needles extend in a predetermined direction enables an occurrence of a fall of needles during collective feeding thereof to be prevented, and a needle bearing to be assembled at a high yield.

The inventors further discussed a various points repeatedly to come to complete the present invention.

According to a first aspect of the present invention, the needle bearing assembling apparatus has a thrust unit adapted to sequentially feed rows of needles, an arrangement unit adapted to properly arrange needles, fed by the thrust unit, into a configuration that corresponds to a configuration of a hollow formed on an inner side of a roller outer race, and an insertion device adapted to fit the arranged needles firmly in the hollow on the inner side of the roller outer race.

According to a second aspect of the present invention, the needle bearing assembling apparatus is in accordance with the first aspect, wherein the needle arrangement unit includes an annularly formed arrangement jig adapted to arrange a predetermined number of needles, fed in a row, into the configuration such that the needles can be fitted into the hollow formed on the inner side of the roller outer race.

According to a third aspect of the present invention, the needle bearing assembling apparatus is in accordance with the first or second aspects, wherein the arrangement unit has a mechanism adapted to be moved vertically until the mechanism gets a predetermined portion of the roller outer race so as to fit the needles firmly into the hollow on the inner side of the roller outer race.

According to a fourth aspect of the present invention, the needle bearing assembling apparatus is in accordance with any one of the first to third aspects, wherein a part feeder is provided for sequentially supplying rows of needles to a storage unit, which storage unit has, a multistage storage mechanism adapted to arrange the rows of needles in multiple stages, the thrust unit includes a needle pusher for sequentially feeding the rows of needles from the storage unit into the arrangement unit until the needles are arranged annularly, and a needle regulating unit is provided for controlling a direction in which the needles are fed into the arrangement unit so that the needles extend in a predetermined direction.

According to a fifth aspect of the present invention, the needle bearing assembling apparatus is in accordance with any one of the first to fourth aspects, wherein provided is a member for supplying grease onto outer circumferential surfaces of the needles while the needles are in the configuration.

According to a sixth aspect of the present invention, the needle bearing assembling apparatus is in accordance with the first aspect, wherein the hollow formed on the inner side of the roller outer race is defined between an inner circumferential surface of the roller outer race and an outer circumferential surface of a roller inner race which is combined and fed with the roller outer race.

BRIEF DESCRIPTION OF THE DRAWINGS

A preferred embodiment of the present invention will be described in detail with reference to the following figures, wherein.

Figure 1:
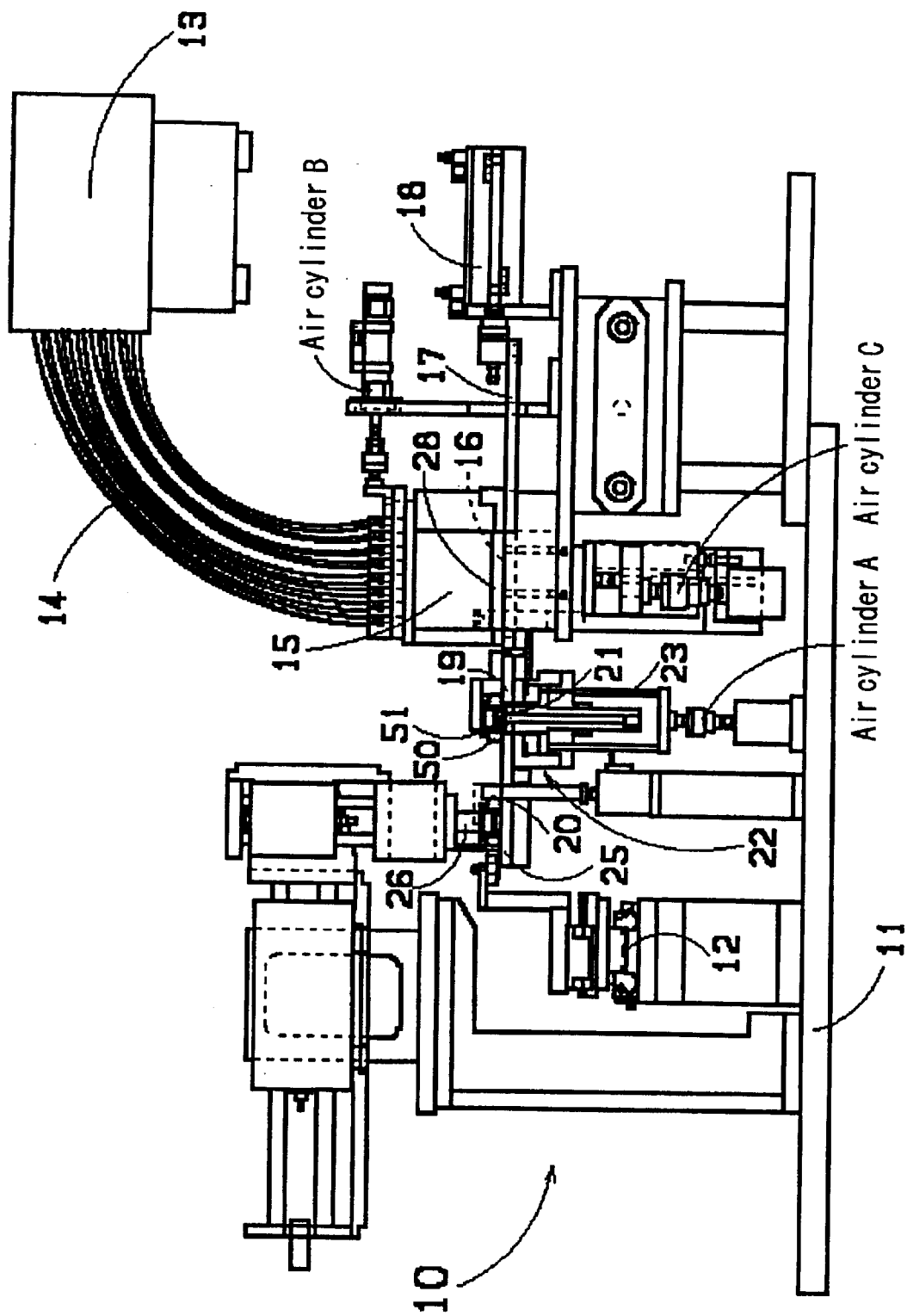
FIG. 1 is a schematic construction diagram in side elevation of an embodiment of a needle bearing assembling apparatus according to the present invention.

DESCRIPTION OF SYMBOLS:

10 . . . needle bearing assembling apparatus
11 . . . base
12 . . . feed unit
13 . . . part feeder
14 . . . spring chute
15 . . . multistage predetermined number of needles storage unit
16 . . . guide plate 17 . . . needle pusher
18 . . . needle thrust unit
19 . . . arrangement jig
20 . . . fixing jig
21 . . . grease supply member
22 . . . arrangement unit
23 . . . needle inserting unit
24 . . . horizontal moving device
25 . . . slide stage
26 . . . fitting jig
27 . . . centering roll
28 . . . arrangement plate
30 . . . sensor
31 . . . needle regulating unit
50 . . . roller outer race
51 . . . roller inner race
52 . . . needles
53 . . . needle bearing
A, B, C . . . air cylinders

DESCRIPTION OF THE PREFERRED EMBODIMENT

An embodiment of the present invention will now be described with reference to the attached drawings.

Figure 2:
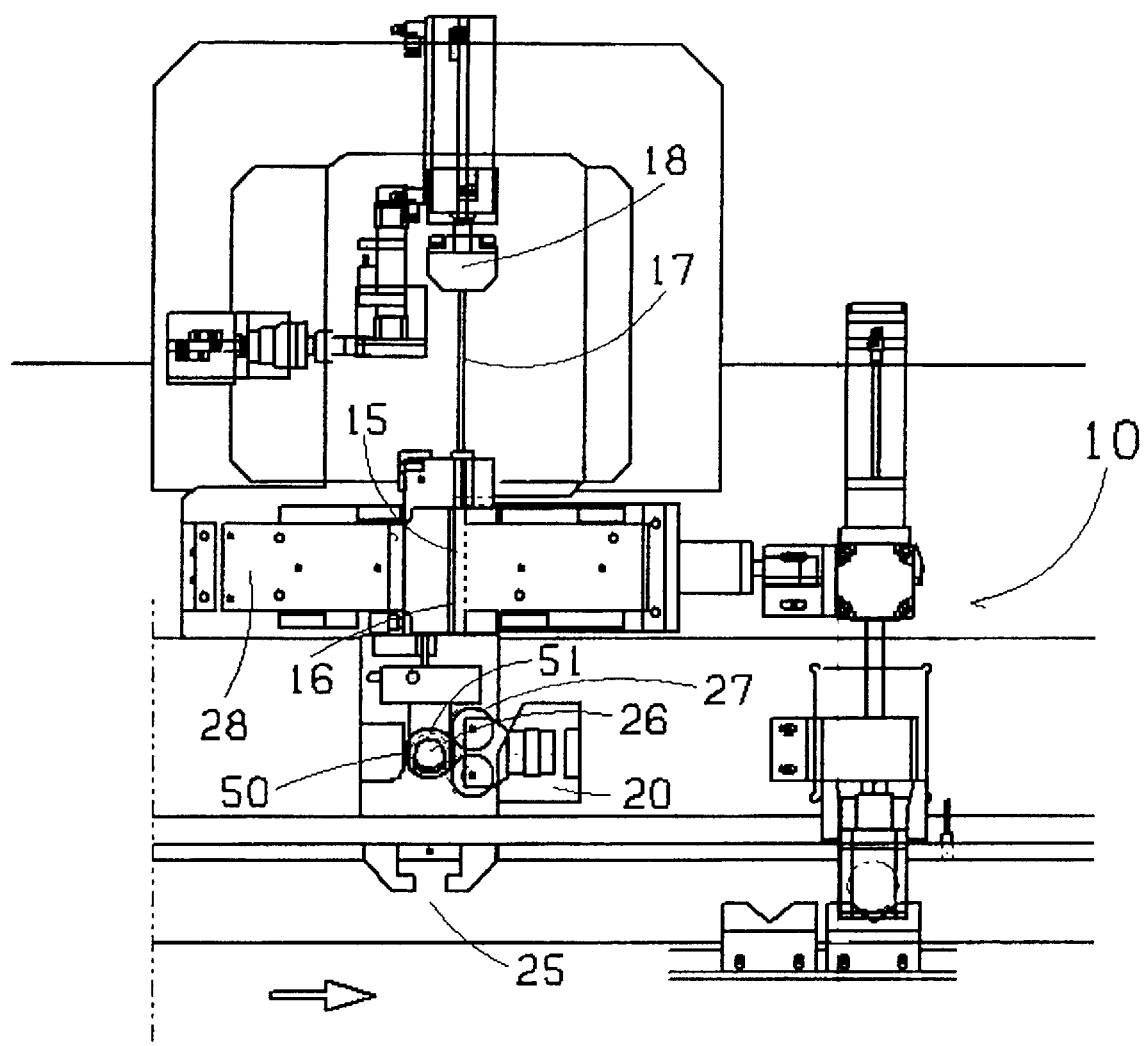
FIG. 2 is a plan view of the needle bearing assembling apparatus shown in FIG. 1.
Figure 3:
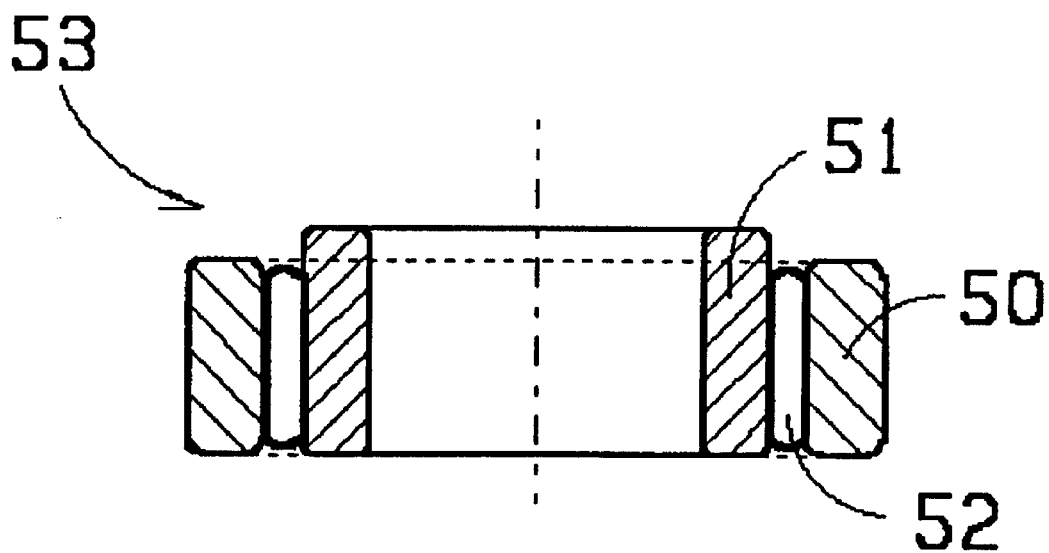
FIG. 3 is a side view of a needle bearing with needles fitted firmly thereinto.
Figure 4:
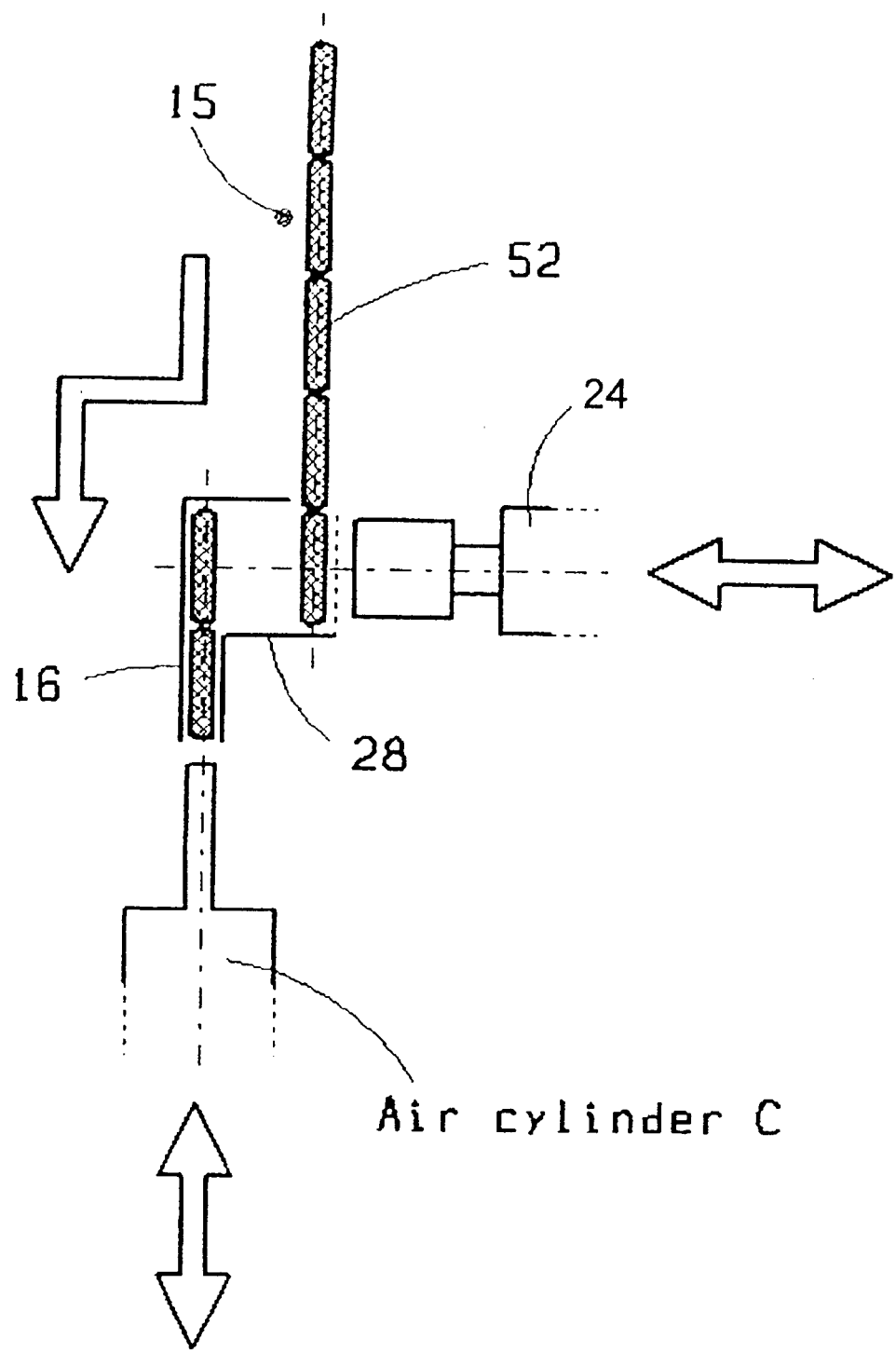
FIG. 4 is a schematic diagram showing a condition in which needles stored in multiple stages are arranged into a row of al predetermined number of needles.
Figure 5:
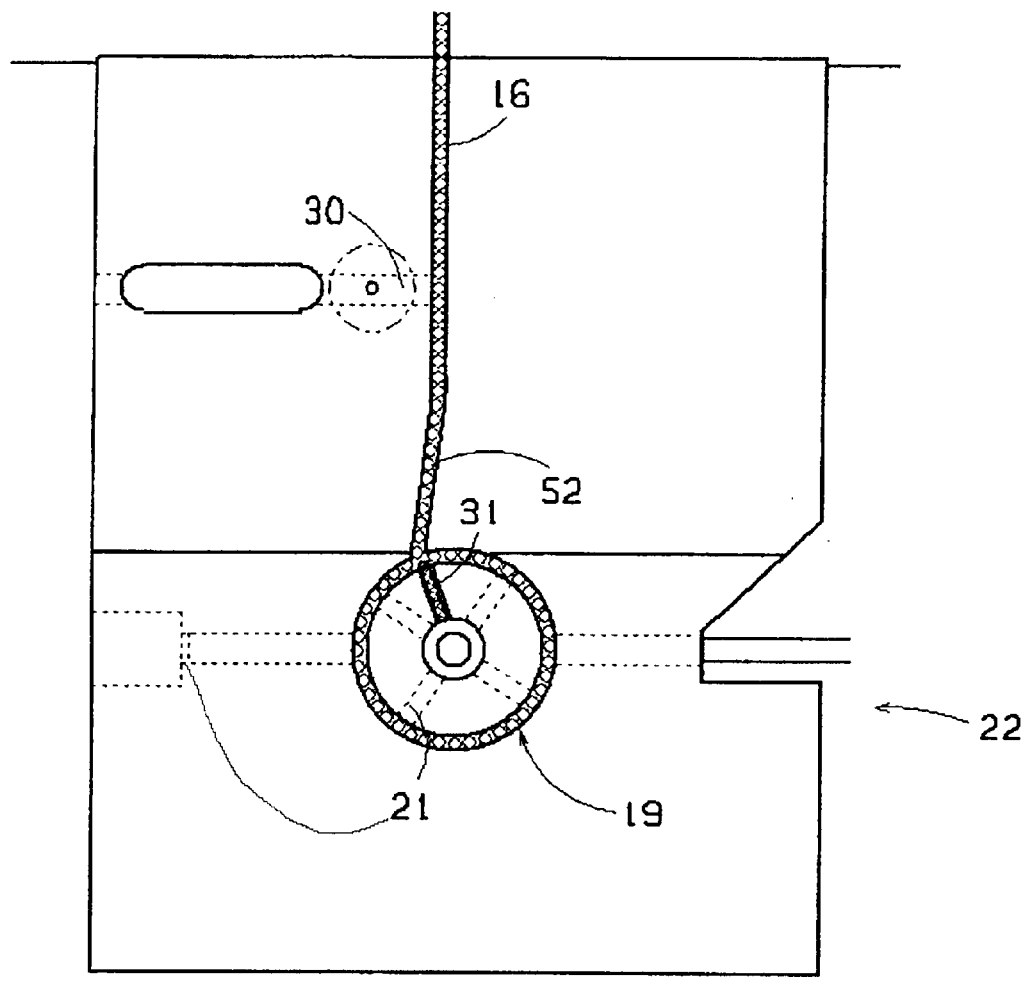
FIG. 5 is a partial enlarged view of an arrangement jig, showing a condition of annularly arranged needles.

FIGS. 1–5 show an embodiment of the present invention. FIG. 1 is a schematic construction diagram in side elevation of a needle bearing assembling apparatus of the embodiment of the present invention. FIG. 2 is a plan view of the needle bearing assembling apparatus shown in FIG. 1. FIG. 3 is a side view of a needle bearing with needles fitted firmly thereinto. FIG. 4 is a schematic diagram showing a condition in which needles stored in multiple stages are arranged into a row of a predetermined number of needles. And, FIG. 5 is a partial enlarged view of an arrangement jig, showing a condition of annularly arranged needles.

First, referring to FIGS. 1–3, a needle bearing assembling apparatus 10 formed on a base 11 is provided with (a) feed unit 12 adapted to feed slidingly in order a roller outer race 50, a roller inner race 51 and a needle-inserted needle bearing 53, (b) a multistage predetermined number of needles storage unit 15 adapted to have fed thereinto needles 52 in multiple rows from a part feeder 13 via a spring chute 14, and to store the needles in multiple stages therein, (c) a needle thrust unit 18 provided with a needle pusher 17 adapted to arrange needles stored in multiple stages into a row of a predetermined number of needles 52 along a guide plate 16, and thereafter send the arranged needles 52 collectively into an annular arrangement jig 19 belonging to an arrangement unit 22, (d) a fixing jig 20 for holding a roller outer race 50 and a roller inner race 51 so that an inner circumferential surface of the roller outer race 50 and an outer circumferential surface of the roller inner race 51 define a hollow therebetween, in a position in which the predetermined number of needles 52 arranged in a row are fitted firmly into the hollow, (e) a unit 21 for supplying grease onto outer circumferential surfaces of the needles and the arrangement unit 22 for annularly arranging the needles 52 fittable into the hollow, and (f) a needle inserting unit 23 adapted to be lifted from an air cylinder A up to a position in which the annularly arranged needles are fitted firmly into the hollow.

First, in the feed unit 12, roller outer races 50 are fed sequentially from an input port (not shown) onto an upper surface of a slide stage 25 thereof. After an inner diameter of the roller outer races 50 are determined by a judgment dummy roller outer race (not shown), a roller inner race 51 is inserted into a space on an inner side of an inner circumferential surface of a roller outer race 50 of a proper inner diameter. When the roller outer race 50 in which the roller inner race 51 has been inserted is fed to a position of the arrangement unit 22, a columnar fitting jig 26 of a diameter identical to that of an inner portion of an inner circumferential surface of the roller inner race 51 is inserted into this inner portion. The fitting jig 26 is adapted to position the roller inner race 51, which is provided so as to define a hollow in advance between the inner circumferential surface of the roller outer race 50 and the outer circumferential surface of the roller inner race 51, in such a manner that needles 52 arranged in predetermined number of rows in an annular configuration are fitted firmly at once into the hollow. After the fitting jig is inserted into the hollow on the inner side of the inner circumferential surface of the roller inner race 51, the inner race 51 is transferred with the roller outer race 50 in a direction at right angles to a direction in which the slide stage 25 is moved, up to a position in which an assembling of needles 52 is performed. In order to provide the above-mentioned hollow, the outer circumferential surface of the roller outer race 50 is supported on a centering roll 27 of the fixing jig 20.

Feeding of needles 52 to be fitted firmly into the hollow on the inner side of the roller outer race 50 will now be described. First, the needles 52 are fed in multiple rows from a part feeder 13 to the multistage predetermined number of needles storage unit 15 via a spring chute 14. The needles 52 fed in multiple rows are slidingly transferred by an air cylinder B, and arranged in a row so that a number of needles corresponds to a predetermined number thereof to be stored in multiple stages. Referring to FIG. 4 as well, needles 52 stored in multiple stages in the multistage storage unit 15 are arranged in a row sequentially in a needle thrust unit 18 along the guide plate 16 in accordance with sliding movements of an arrangement plate 28 and an air cylinder C. A predetermined number of needles 52 arranged in a row are sent collectively into the annular arrangement jig 19, which is adapted to arrange the needles 52 so as to be fittable into the hollow formed as mentioned above, by a plate type needle pusher 17 having a width and height which are equal to those of the guide plate 16. Prior to being sent by the needle pusher 17, the needles 52 are moved by a horizontal moving device 24 to a position from which the needles are sent by the needle pusher into the annular arrangement jig 19. Referring to FIG. 5 as well, ascertaining of a number of needles 52 being sent collectively into the arrangement jig 19 is performed by a sensor 30 immediately before the needles 52 are sent collectively into the jig 19. Since the needles 52 are sent collectively into the jig 19, ascertaining of the number of the needles 52 can be done more accurately and easily than in a case where needles are sent one by one into a similar jig. A device for firmly fitting the needles 52, which are sent collectively into the jig 19, in the mentioned hollow will be described. First, needles 52 are sent in order in a predetermined direction at all times into the annular arrangement jig 19 and arranged properly. In order to provide regularity to a direction in which the needles 52 are sent, sending of the needles 52 in a contrary direction is prevented by a plunger member-carrying needle regulating unit 31. The needle regulating unit 31 can prevent a contra-flow of needles. While needles 52 are forced into the arrangement jig 19, grease for firmly fitting the needles into the hollow is supplied from a grease supply member 21 onto an outer circumferential surfaces of the needles 52. The needles 52 annularly arranged in the arrangement jig 19 are lifted until the needles arrive at a predetermined portion of the roller outer race 50 so that the needles are fitted firmly into the hollow by the air cylinder A, and the needles 52 are thereby fitted firmly in practice into the hollow.

A needle bearing 53 in which needles 52 are fitted firmly is transferred to a position of the slide stage 25 of the feed unit 12, and combining of other structural parts, for example, snap rings with the bearing is performed so as to complete assembling of the needle bearing.

According to the present invention, a needle bearing can be assembled with an improved operation efficiency and at a high yield by a needle bearing assembling apparatus having a thrust unit adapted to feed needles sequentially in a row, an arrangement unit adapted to arrange needles fittable into a hollow formed on an inner side of a roller outer race, and a device adapted to fit the arranged needles firmly into the hollow on the inner side of the roller outer race. Since the needles are pushed collectively into an arrangement jig, ascertaining of a number of the predetermined number of needles can be done continuously, and an incidence of shortage of a number thereof can be ascertained easily.

What is claimed is:

1. A needle bearing assembling apparatus comprising:
   a storage unit having a multistage storage mechanism adapted to arrange rows of needles in multiple stages;
   a thrust unit adapted to sequentially feed the rows of needles;
   an arrangement unit adapted to arrange needles, fed by said thrust unit, into a configuration that corresponds to an inner configuration of an outer race; and
   an insertion unit adapted to insert the needles, while in the configuration, into the outer race.

2. The needle bearing assembly apparatus according to claim 1, further comprising:
   a part feeder for sequentially supplying the rows of needles to said storage unit.

3. The needle bearing assembly apparatus according to claim 2, wherein
   said thrust unit is adapted to sequentially feed the rows of needles by including a needle pusher for sequentially pushing the rows of needles, and
   said arrangement unit is adapted to arrange the needles into the configuration by having the needles be pushed by said needle pusher into said arrangement unit until the needles are arranged into an annular configuration.

4. The needle bearing assembly apparatus according to claim 3, further comprising:
   a regulating unit adapted to control a direction in which the needles are pushed into said arrangement unit via said needle pusher.

5. The needle bearing assembly apparatus according to claim 4, wherein
   said arrangement unit includes an annular arrangement jig such that the needles are to be arranged into the annular configuration by being pushed into said annular arrangement jig via said needle pusher.

6. The needle bearing assembly apparatus according to claim 5, wherein
   said insertion unit is adapted to insert the needles into the outer race by including a needle inserting mechanism for moving the needles, while in the configuration, vertically into the outer race.

7. The needle bearing assembly apparatus according to claim 6, further comprising:
   a member for supplying grease onto outer circumferential surfaces of the needles prior to the needles being moved into the outer race.

8. The needle bearing assembly apparatus according to claim 7, further comprising:
   a mechanism for combining an inner race with the outer race such that a space is defined between an outer circumferential surface of the inner race and an inner circumferential surface of the outer race,
   wherein said needle inserting mechanism is for moving the needles, while in the configuration, into the outer race by moving the needles, while in the configuration, into the space between the outer circumferential surface of the inner race and the inner circumferential surface of the outer race.

9. The needle bearing assembly apparatus according to claim 5, further comprising:
   a member for supplying grease onto outer circumferential surfaces of the needles prior to the needles being moved into the outer race.

10. The needle bearing assembly apparatus according to claim 5, further comprising:
    a mechanism for combining an inner race with the outer race such that a space is defined between an outer circumferential surface of the inner race and an inner circumferential surface of the outer race,
    wherein said insertion unit is adapted to insert the needles, while in the configuration, into the outer race by inserting the needles, while in the configuration, into the space between the outer circumferential surface of the inner race and the inner circumferential surface of the outer race.

11. The needle bearing assembly apparatus according to claim 4, wherein
    said insertion unit is adapted to insert the needles into the outer race by including a needle inserting mechanism for moving the needles, while in the configuration, vertically into the outer race.

12. The needle bearing assembly apparatus according to claim 11, further comprising:
    a member for supplying grease onto outer circumferential surfaces of the needles prior to the needles being moved into the outer race.

13. The needle bearing assembly apparatus according to claim 11, further comprising:
    a mechanism for combining an inner race with the outer race such that a space is defined between an outer circumferential surface of the inner race and an inner circumferential surface of the outer race,
    wherein said needle inserting mechanism is for moving the needles, while in the configuration, into the outer race by moving the needles, while in the configuration, into the space between the outer circumferential surface of the inner race and the inner circumferential surface of the outer race.

14. The needle bearing assembly apparatus according to claim 4, further comprising:
    a member for supplying grease onto outer circumferential surfaces of the needles prior to the needles being moved into the outer race.

15. The needle bearing assembly apparatus according to claim 14, further comprising:
    a mechanism for combining an inner race with the outer race such that a space is defined between an outer circumferential surface of the inner race and an inner circumferential surface of the outer race,
    wherein said insertion unit is adapted to insert the needles, while in the configuration, into the outer race by inserting the needles, while in the configuration, into the space between the outer circumferential surface of the inner race and the inner circumferential surface of the outer race.

16. The needle bearing assembly apparatus according to claim 4, further comprising:

a mechanism for combining an inner race with the outer race such that a space is defined between an outer circumferential surface of the inner race and an inner circumferential surface of the outer race, wherein said insertion unit is adapted to insert the needles, while in the configuration, into the outer race by inserting the needles, while in the configuration, into the space between the outer circumferential surface of the inner race and the inner circumferential surface of the outer race.

17. The needle bearing assembly apparatus according to claim 1, wherein said thrust unit is adapted to sequentially feed the rows of needles by feeding the needles into said arrangement unit, and further comprising:

a regulating unit adapted to control a direction in which the needles are fed into said arrangement unit via said thrust unit.

18. The needle bearing assembly apparatus according to claim 1, wherein the configuration is an annular configuration, and said arrangement unit includes an annular arrangement jig such that the needles are to be arranged into the annular configuration by being fed into said annular arrangement jig via said thrust unit.

19. The needle bearing assembly apparatus according to claim 1, wherein said insertion unit is adapted to insert the needles into the outer race by including a needle inserting mechanism for moving the needles, while in the configuration, vertically into the outer race.

20. The needle bearing assembly apparatus according to claim 1, further comprising:

a member for supplying grease onto outer circumferential surfaces of the needles prior to the needles being moved into the outer race.

21. The needle bearing assembly apparatus according to claim 1, further comprising:

a mechanism for combining an inner race with the outer race such that a space is defined between an outer circumferential surface of the inner race and an inner circumferential surface of the outer race, wherein said insertion unit is adapted to insert the needles, while in the configuration, into the outer race by inserting the needles, while in the configuration, into the space between the outer circumferential surface of the inner race and the inner circumferential surface of the outer race.

* * * * *